(12) United States Patent
Shi et al.

(10) Patent No.: US 6,584,141 B1
(45) Date of Patent: Jun. 24, 2003

(54) DS-CDMA SYSTEM WITH HIGH RESOLUTION TIMING

(75) Inventors: Qicai Shi, Coral Springs, FL (US); Robert J. O'Dea, Ft. Lauderdale, FL (US)

(73) Assignee: Motorola, Inc., Schaumburg, IL (US)

( * ) Notice: Subject to any disclaimer, the term of this patent is extended or adjusted under 35 U.S.C. 154(b) by 31 days.

(21) Appl. No.: 10/036,557

(22) Filed: Dec. 21, 2001

(51) Int. Cl.⁷ .................. H04B 15/00; H04K 1/00; H04L 27/30
(52) U.S. Cl. .............. 375/142; 375/140; 375/150; 375/343
(58) Field of Search .............. 375/142, 140, 375/130, 146, 147, 150, 343; 370/335, 342, 441

(56) References Cited

U.S. PATENT DOCUMENTS

| | | | | |
|---|---|---|---|---|
| 5,832,044 A | * | 11/1998 | Sousa et al. | 375/347 |
| 5,909,471 A | * | 6/1999 | Yun | 375/343 |
| 6,067,292 A | * | 5/2000 | Huang et al. | 370/342 |

* cited by examiner

Primary Examiner—Mohammad H. Ghayour
(74) Attorney, Agent, or Firm—Barbara R. Doutre; Andrew S. Fuller

(57) ABSTRACT

A method and apparatus for DS-CDMA communication having improved timing resolution. In the transmitter, a signal spread by a first sequence of pulses is generated with pulse shape given by $$p\left(\frac{t}{T_c}\right),$$

where $t$ is time and $T_c$ is the chip period or pulse width. The pulses have an auto-correlation function $$q\left(\frac{t}{T_c}\right).$$

In receiver, a second sequence of pulses with pulse shape given by $$p\left(\frac{t}{T_c}\right)$$

is generated. When correlated with the first sequence of pulses the resulting correlation function is proportional to $$q\left(\frac{t}{T_c}\right) - q\left(\frac{t}{T_c} - 1\right).$$

This correlation function narrower peaks than the correlation function $$q\left(\frac{t}{T_c}\right),$$

thereby allowing higher time resolution to be achieved. The correlation function is achieved by modification of the transmitter or receiver modulation sequences or by modification of the correlator in the receiver.

10 Claims, 4 Drawing Sheets

-PRIOR ART-

-PRIOR ART-

DS-CDMA SYSTEM WITH HIGH RESOLUTION TIMING

TECHNICAL FIELD

This invention relates to techniques and apparatus for wireless communication using Direct Sequence Spread Spectrum (DSSS) techniques.

BACKGROUND OF THE INVENTION

In the transmitter of a direct-sequence spread spectrum communication systems, a carrier waveform is modulated by a data sequence x(n) and by a spreading sequence or code sequence C(n). The code sequence may be a pseudo-noise (PN) sequence, such as a maximum length sequence (m-sequence). The PN sequence is used to reduce the sensitivity of the communication channel to noise, reduce the power spectral density of the signal and to allow multiple communication channels to operate simultaneously. In the latter case, each channel is assigned its own PN code sequence, so the technique is called code-division multiple access (CDMA).

In the receiver the data signal is recovered by removing the carrier wave and then correlating the received signal with the PN code sequence used for transmission. The recovery of the data signal in the receiver is hindered by interference. The correlation process removes much of the uncorrelated interference, but other interference is due to the signal reaching the receiver by indirect propagation paths. This multipath interference is correlated with the PN code sequence. The presence of multipath interference makes it more difficult to align the received signal with the PN code sequence and increases the likelihood that a signal is incorrectly decoded. Equalizers can be used to mitigate the effects of multipath interference, but these require large amounts of computation and are not suitable for a low cost receiver.

In a DSSS location system, the distance between the transmitter and the receiver is determined from the propagation time, which must be determined accurately for an accurate location to be determined. However, multipath interference can significantly degrade the accuracy of the propagation timing estimation, and hence the location cannot be determined accurately in a multipath interference environment.

In view of the preceding remarks, it is clear that there is an unmet need in the art for a low cost DS-CDMA receiver that can accurately decode a signal and determine the propagation time in the presence of multipath interference.

BRIEF DESCRIPTION OF THE DRAWINGS

The features of the invention believed to be novel are set forth with particularity in the appended claims. The invention itself however, both as to organization and method of operation, together with objects and advantages thereof, may be best understood by reference to the following detailed description of the invention, which describes certain exemplary embodiments of the invention, taken in conjunction with the accompanying drawings in which:

DETAILED DESCRIPTION OF THE INVENTION

Figure 1:
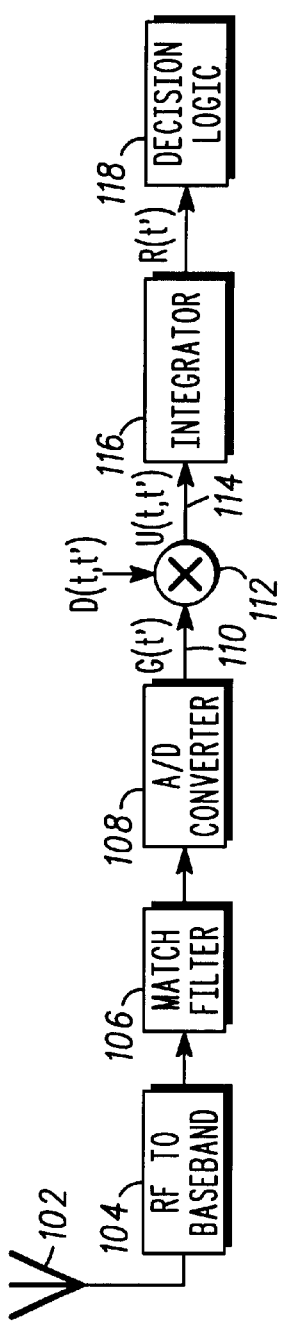
FIG. 1 is a block diagram illustrating a receiver in accordance with an embodiment of the present invention.

While this invention is susceptible of embodiment in many different forms, there is shown in the drawings and will herein be described in detail specific embodiments, with the understanding that the present disclosure is to be considered as an example of the principles of the invention and not intended to limit the invention to the specific embodiments shown and described. In the description below, like reference numerals are used to describe the same, similar or corresponding parts in the several views of the drawings.

In direct sequence spread spectrum (DSSS) communication, a pseudo-noise (PN) code sequence, such as an m-sequence, is used to modulate a carrier waveform and thereby spread the spectrum of the transmitted signal. A PN code sequence of length N is denoted by $C=(C_1, C_2, C_3, \ldots, C_N)$, where $C_i$ has the value 1 or −1. The PN code sequence preferably has the property that the correlation of the sequence with a cyclically time-shifted version of itself has an absolute value of one or zero, whereas the correlation of the code sequence with itself has the value N.

In direct sequence spread spectrum communication each bit is transmitted as a carrier wave modulated by the function $$F(t) = b \sum_{n=0}^{N-1} p\left(\frac{t}{T_c} - n\right) \cdot c(n),$$

where t is time and b=1 for a one bit and b=−1 for a zero bit. The pulse shape p(t) is given as the rectangular function $$p(t) = \begin{cases} 1 & 0 \leq t < 1 \\ 0 & \text{otherwise} \end{cases}$$

and c(n) is the nth value of the PN code sequence of length N. Other pulse shapes may be used, but the rectangular pulse is used as an example in this description.

The auto-correlation of p(t) is the triangular function q(t) given by $$q(t) \equiv \int p(t')p(t'+t)dt' = \begin{cases} 1-|t|, & |t|<1 \\ 0, & \text{otherwise} \end{cases}.$$

The function $q(t/T_c)$ has a width $2T_c$, i.e. twice the chip period.

In one embodiment of the receiver, as shown in FIG. 1, the signal is received via antenna 102, converted from radio frequency (RF) band to baseband in converter 104, passed through matched filter 106 and sampled in analog-to-digital converter (ADC) 108. The resulting signal G(t) 110 is the recovered modulation signal which is given by $$G(t) = b \sum_{n=0}^{N-1} \left[ p\left(\frac{t-\tau}{T_c} - n\right) + r \cdot p\left(\frac{t-\tau-T}{T_c} - n\right)\right] \cdot c(n),$$

where T is the time difference between the line of site (LOS) received signal and reflected or multi-path signal, τ is the propagation time between the transmitter and receiver and r is the relative amplitude of the multi-path signal. This signal is multiplied in the receiver at 112 by the signal $$D(t, t') = \sum_{n=0}^{N-1} p\left(\frac{t-t'}{T_c} - n\right) \cdot d(n),$$

where d(n) is the nth value of the PN code sequence in the receiver and t' is a time offset. The resulting signal 114 is $$U(t, t') = b\sum_{n=0}^{N-1}\left[p\left(\frac{t-\tau}{T_c} - n\right) + r \cdot p\left(\frac{t-\tau-T}{T_c} - n\right)\right] \cdot c(n) \sum_{m=0}^{N-1} p\left(\frac{t-t'}{T_c} - m\right) \cdot d(m),$$

where t' is the time offset between the received signal and the demodulation signal. Note that only a single component is shown in the figure, however, both in-phase and quadrature components can be treated similarly.

Figure 2:
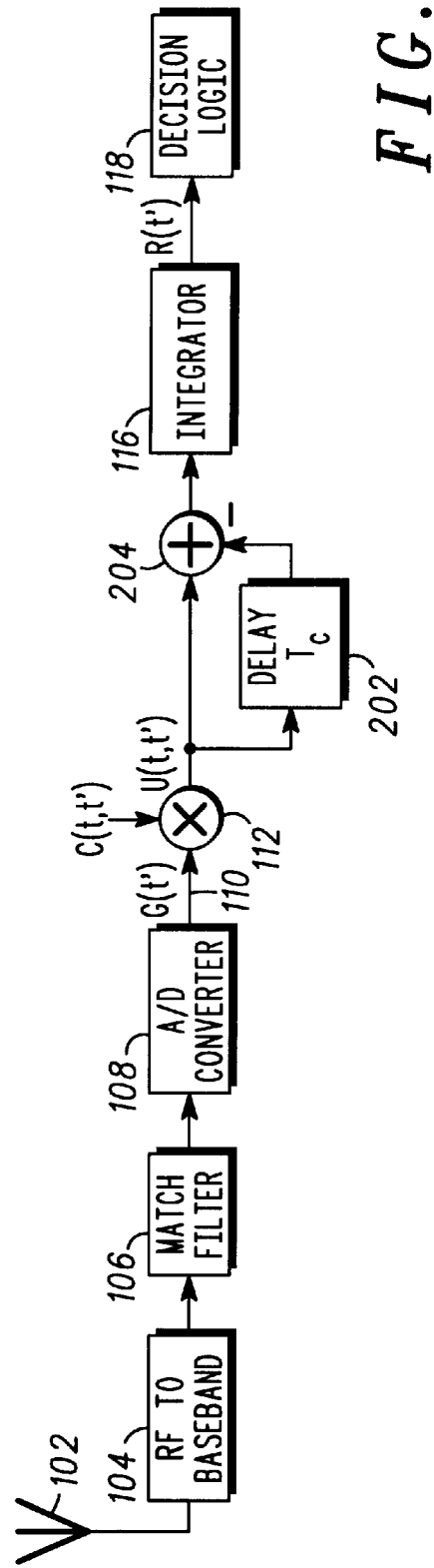
FIG. 2 is a block diagram illustrating a receiver in accordance with a further embodiment of the present invention.

In a further embodiment, shown in FIG. 2, the signal U(t,t') is delayed in delay element 202 by one chip period, $T_c$, and then subtracted from U(t,t') at 204 to give the signal $U(t,t') - U(t-T_c,t')$. This further embodiment will be discussed in more detail later.

Figure 3:
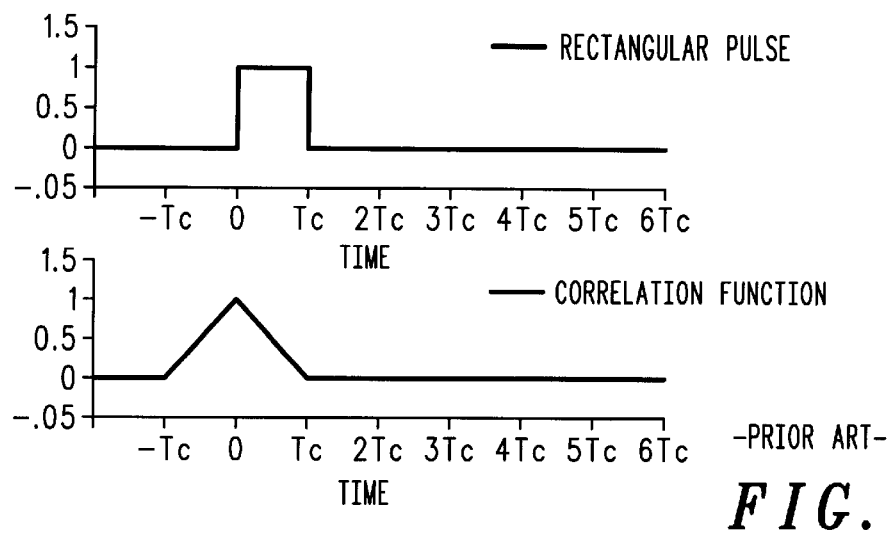
FIG. 3 depicts a pulse shape and auto-correlation function of the prior art.

The signal U(t,t') in FIG. 1 is integrated over time in integrator 116, this gives the correlation value $$R(t') = \int U(t, t')dt = b\sum_{m=0}^{N-1}\sum_{n=0}^{N-1} \int \left[p\left(\frac{t-\tau}{T_c} - n\right) + r \cdot p\left(\frac{t-\tau-T}{T_c} - n\right)\right] p\left(\frac{t-t'}{T_c} - m\right) dt \cdot c(n) d(m)$$

$$= b\sum_{m=0}^{N-1}\sum_{n=0}^{N-1}\left[q\left(\frac{t'-\tau}{T_c} - n+m\right) + rq\left(\frac{t'-\tau-T}{T_c} - n+m\right)\right] \cdot c(n)d(m),$$

where q(t) is the auto-correlation function of the pulse. The upper plot in FIG. 3 shows the rectangular pulse function p(t), while the lower plot in FIG. 3 shows the auto-correlation of the rectangular pulse, q(t).

Figure 4:
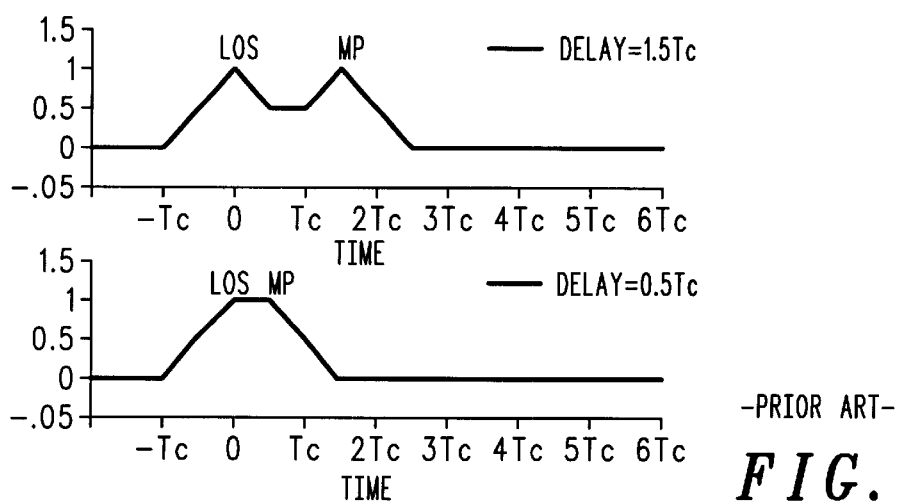
FIG. 4 depicts correlation functions of the prior art.

In a standard DSSS system, the transmitting PN code c(n) and the receiving PN code d(n) are the same PN code sequence, C(n), say. The correlation value, for $-T_c < t' - \tau < T_c$, is then $$R(t') = b\sum_{n=0}^{N-1}\left[q\left(\frac{t'-\tau}{T_c}\right)C(n)C(n) + q\left(\frac{t'-\tau}{T_c} - 1\right)C(n)C(n+1) + q\left(\frac{t'-\tau}{T_c} + 1\right)C(n)C(n-1) + \cdots\right]$$

$$= b\sum_{n=0}^{N-1}\left[q\left(\frac{t'-\tau}{T_c}\right) + rq\left(\frac{t'-\tau-T}{T_c}\right)\right]C(n)C(n)$$

$$= bN\left[q\left(\frac{t'-\tau}{T_c}\right) + rq\left(\frac{t'-\tau-T}{T_c}\right)\right],$$

where we have used the orthogonality property of the PN code sequence. In a DSSS location system, the distance between the transmitter and the receiver is determined from the propagation time, which must be determined accurately for an accurate location to be determined. In the absence of multi-path signals, the integrated value has a peak when $t' = \tau$, which correctly identifies the propagation time. In the presence of multi-path, there will be two peaks in the integrated value when the time difference between the reflected path and the LOS path is greater than $T_c$. The normalized correlation function $$\frac{R(t, T)}{bN} = q\left(\frac{t}{T_c}\right) + rq\left(\frac{t-T}{T_c}\right)$$

is shown in FIG. 4 as a function of t, for the case r=1. In the upper plot $T=1.5T_c$, and the LOS peak is separated from the multi-path peak. However, there is a single 'smeared' peak when $T < T_c$, and the propagation time, and hence the location, can not be determined with as much accuracy. This is illustrated in the lower plot in FIG. 4, where the multi-path delay is $T=0.5T_c$.

In a first embodiment of the present invention, the transmitting code sequence is $c=C=(C_1, C_2, C_3, \ldots, C_N)$. The receiving code sequence is $d=C_c=(C_1-C_2, C_2-C_3, C_3-C_4, \ldots, C_{N-1}-C_N, C_N-C_1)$. The result of the integration $$R(t') = b\sum_{m=0}^{N-1}\sum_{n=0}^{N-1}\left[q\left(\frac{t'-\tau}{T_c} - n+m\right) + rq\left(\frac{t'-\tau-T}{T_c} - n+m\right)\right] \cdot C(n)(C(m) - C(m+1))$$

$$= bN\left[q\left(\frac{t'-\tau}{T_c}\right) - q\left(\frac{t'-\tau}{T_c} - 1\right) + rq\left(\frac{t'-\tau-T}{T_c}\right) - rq\left(\frac{t'-\tau-T}{T_c} - 1\right)\right].$$

Figure 5:
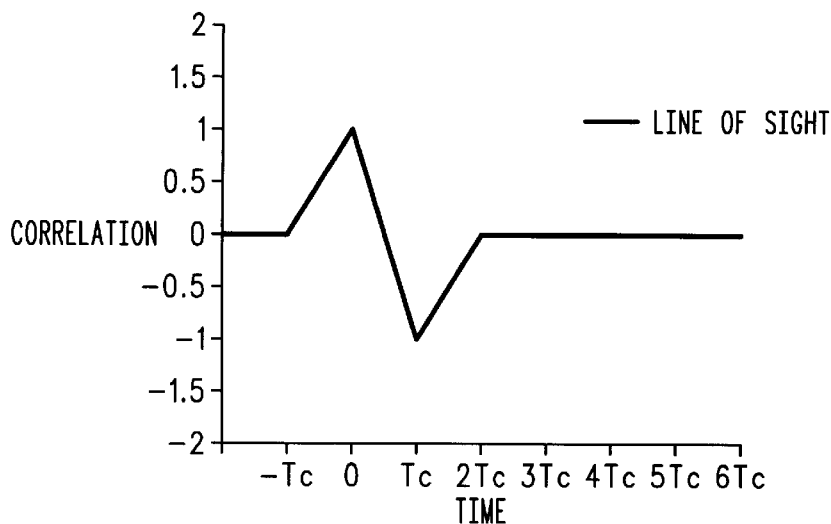
FIG. 5 depicts a correlation function of the present invention.

In the absence of multi-path, the result of the integration, when normalized by bN, is $$q\left(\frac{t'-\tau}{T_c}\right) - q\left(\frac{t'-\tau}{T_c} - 1\right)$$

which is plotted in FIG. 5 as a function of $t'-\tau$. The positive peak occurs when $t'-\tau=0$, i.e. when t' is equal to the propagation time, $\tau$. There is also a negative peak. The peaks have width $1.5T_c$ which provides a better resolution than the standard system. In the further embodiment of the invention, shown in FIG. 2, the transmitting code sequence is $c=C=(C_1, C_2, C_3, \ldots, C_N)$. The receiving code sequence is also $d=C=(C_1, C_2, C_3, \ldots, C_N)$. The signal $U(t-T_c,t')$ is then subtracted from the signal U(t,t') at 204 and integrated over a period $NT_c$ to give $$R(t') = \int (U(t, t') - U(t - T_c, t'))dt$$

$$= \int (G(t)D(t, t') - G(t - T_c)D(t - T_c, t'))dt$$

$$= \int G(t)D(t, t')dt - \int G(t - T_c)D(t - T_c, t')dt$$

Using the result from the standard DSSS system, we find $$R(t') = bN\left[q\left(\frac{t'-\tau}{T_c}\right) + rq\left(\frac{t'-\tau-T}{T_c}\right) - q\left(\frac{t'-\tau}{T_c} - 1\right) - rq\left(\frac{t'-\tau-T}{T_c} - 1\right)\right],$$

which is the same as in the first embodiment. It is noted that the difference operation and the integration operation are linear, and so the order of the operations may be interchanged.

In a third embodiment, the transmitter code is $c=C_b=(C_1, -C_1, C_2, -C_2, C_3, -C_3, \ldots, C_N, -C_N)$ and the receiver code is and $d=(C_1, 0, C_2, 0, C_3, 0, \ldots, C_N, 0)$. The integral of the product of the received modulation signal and the receiver code over a time $2NT_c$ is the same as above.

Figure 6:
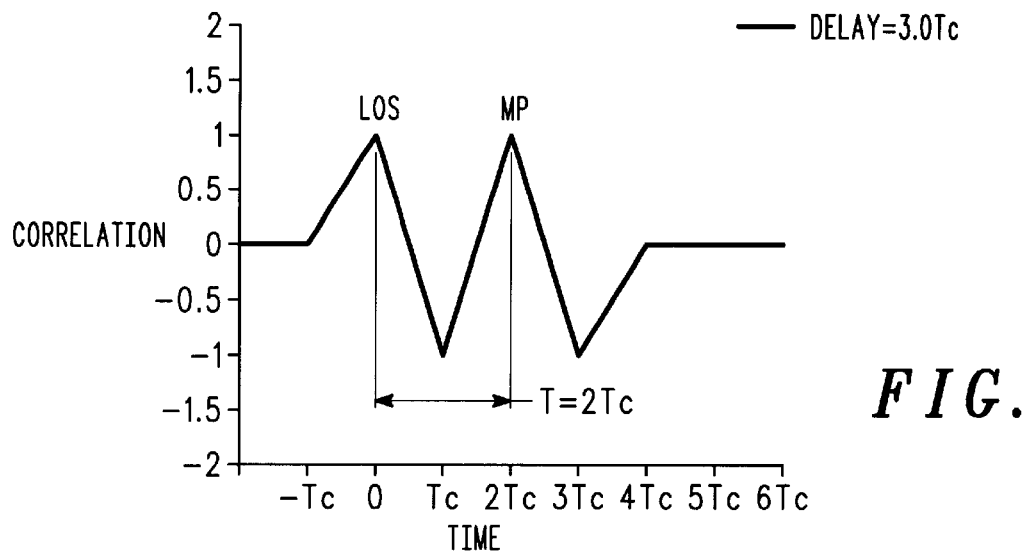
FIGS. 6–9 depict correlation functions of the present invention in the presence of multipath interference.
Figure 7:
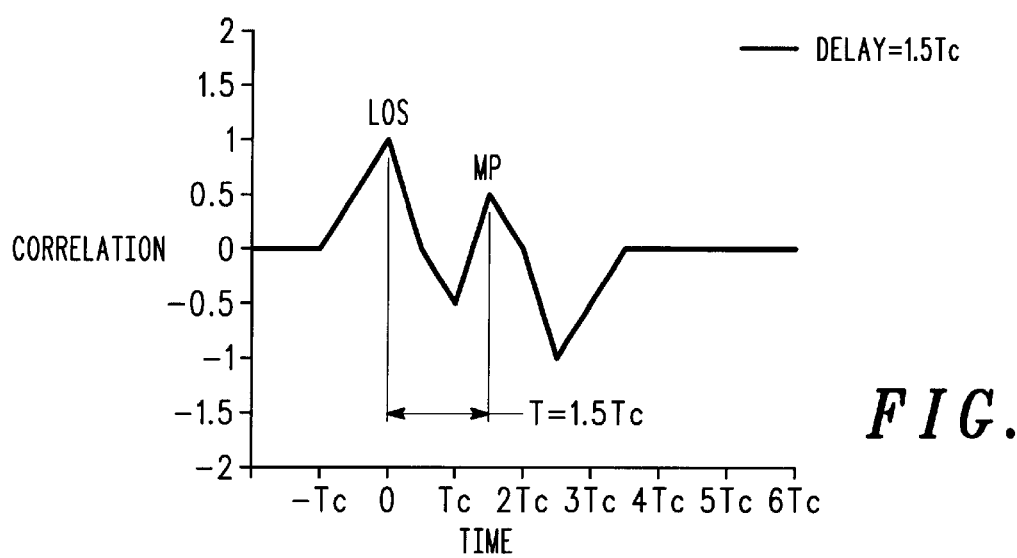
Figure 8:
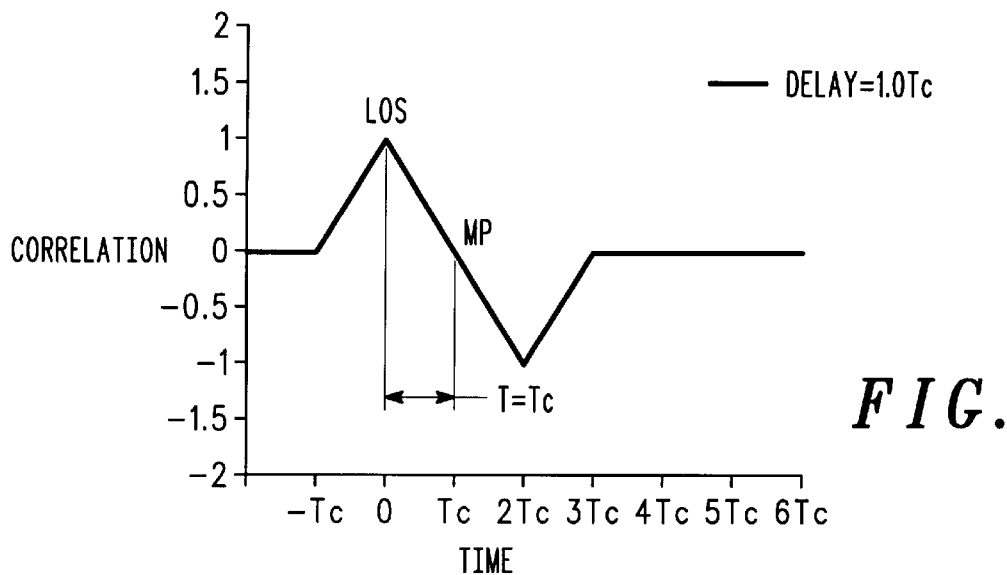
Figure 9:
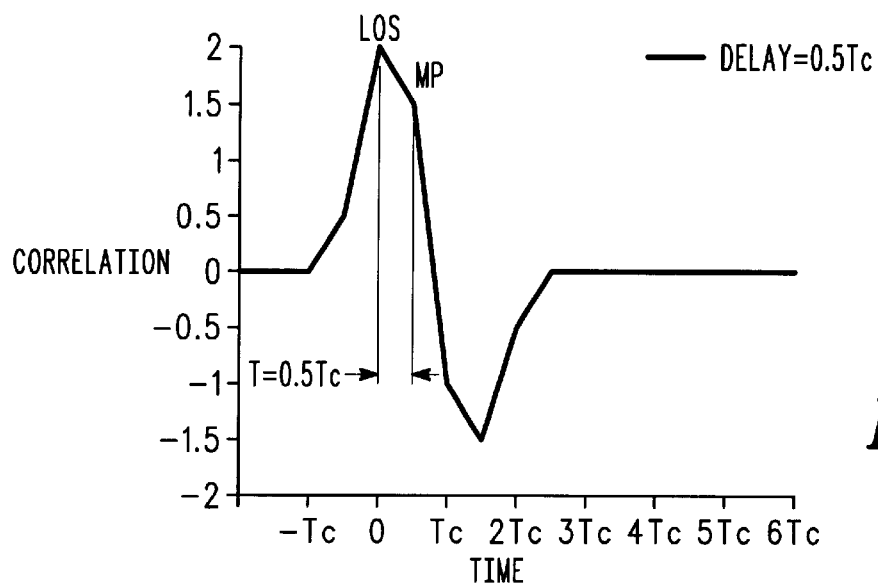

The multiple peaks in the correlation function allow the LOS and the multi-path peak to be separated. This is illustrated in FIGS. 6–9 that show the normalized correlation function $$\frac{R(t')}{bN} = q\left(\frac{t'-\tau}{T_c}\right) - q\left(\frac{t'-\tau}{T_c}-1\right) + rq\left(\frac{t'-\tau-T}{T_c}\right) - rq\left(\frac{t'-\tau-T}{T_c}-1\right)$$

as a function of t'−τ, for the case r=1. FIG. 6 shows the case where $T=2T_c$. In this case there are two distinct peaks. The first positive peak, labeled LOS, occurs when t'−τ=0, i.e. t'=τ, correctly identifying the propagation time for the line-of-sight signal. The multi-path peak, labeled MP, occurs a time T later. FIG. 7 shows the case where $T=1.5T_c$, FIG. 8 shows the case where $T=T_c$, and FIG. 9 shows the case where $T=0.5T_c$. In all cases there is a clear peak, labeled LOS, that occurs when t'−τ=0 and correctly identifies the propagation time.

In the general case, the pulse shape in the transmitter is given $$p\left(\frac{t}{T_c}\right)$$

and has auto-correlation functions $$q\left(\frac{t}{T_c}\right).$$

The transmitter and receiver are designed so that the correlation between the transmitted signal and the demodulating sequence is $$q\left(\frac{t}{T_c}\right) - q\left(\frac{t}{T_c}-1\right).$$

In the embodiments described above, this is achieved by modifying the transmitted and/or received PN codes or by calculating a difference in the receiver.

Those of ordinary skill in the art will recognize that the present invention has been described in terms of exemplary embodiments based upon use of an ideal rectangular pulse. However, the invention should not be so limited, since the present invention could be implemented using other pulse shapes. Similarly, the present invention may be implemented using general purpose computers, microprocessor based computers, digital signal processors, microcontrollers, dedicated processors, custom circuits, ASICS and/or dedicated hard wired logic.

Many other variations will also be evident to those of ordinary skill in the art. The embodiment disclosed can be embodied in a DS-CDMA receiver for a location system, however, the method and apparatus is equally applicable to other systems using DS-CDMA techniques.

While the invention has been described in conjunction with specific embodiments, it is evident that many alternatives, modifications, permutations and variations will become apparent to those of ordinary skill in the art in light of the foregoing description. Accordingly, it is intended that the present invention embrace all such alternatives, modifications and variations as fall within the scope of the appended claims.

What is claimed is:

1. A DS-CDMA communication system comprising:
   a transmitter for generating a first sequence of pulses with pulse shape given by $$p\left(\frac{t}{T_c}\right)$$

where t is time and $T_c$ is width of the pulse, said pulses having an the auto-correlation function $$q\left(\frac{t}{T_c}\right);$$

and
a receiver for receiving said first sequence of pulses, said receiver comprising:
   means for generating a second sequence of pulses with pulse shape given by $$p\left(\frac{t}{T_c}\right);$$

a correlator for correlating said first and second sequence of pulses to obtain a correlation function; and
a peak detector for detecting peaks in said correlation function,
wherein, in the absence of interference, said correlation function is proportional to $$q\left(\frac{t}{T_c}\right) - q\left(\frac{t}{T_c}-1\right).$$

2. A DS-CDMA communication system as in claim 1, wherein said transmitter further comprises a modulator for modulating said first sequence of pulses by a carrier signal to a obtain a modulated sequence of pulses and said receiver further comprises a demodulator for recovering said first sequence of pulses from said modulated sequence of pulses.

3. A DS-CDMA communication system as in claim 1, wherein said first sequence of pulses is generated from a pseudo-noise sequence $C=(C_1, C_2, C_3, \ldots, C_N)$ where $C_i=\pm1$, said second sequence of pulses is generated from a sequence $C_c=(C_1-C_2, C_2-C_3, C_3-C_4, \ldots, C_{N-1}-C_N, C_N-C_1)$ and correlator comprises:
   a multiplier for multiplying said first and second sequences of pulses to obtain a product signal; and
   an integrator for integrating said product signal to obtain said correlation function.

4. A DS-CDMA communication system as in claim 1, wherein said second sequence of pulses is generated from a pseudo-noise sequence $C=(C_1, C_2, C_3, \ldots, C_N)$ where $C_i=\pm1$, said first sequence of pulses is generated from a sequence $C_c=(C_1-C_2, C_2-C_3, C_3-C_4, \ldots, C_{N-1}-C_N, C_N-C_1)$ and correlator comprises:
   a multiplier for multiplying said first and second sequences of pulses to obtain a product signal; and
   an integrator for integrating said product signal to obtain said correlation function.

5. A DS-CDMA communication system as in claim 1, wherein said first sequence of pulses is generated from a pseudo-noise sequence $C=(C_1, C_2, C_3, \ldots, C_N)$ where $C_i=\pm1$, said second sequence of pulses is generated from the sequence $C=(C_1, C_2, C_3, \ldots, C_N)$ and correlator comprises:
   a multiplier for multiplying said first and second sequences of pulses to obtain a product signal;
   a delay element for delaying said product signal to obtain a delayed product signal;

a subtract for subtracting said delayed product signal form said product signal to obtain a difference signal; and an integrator for integrating said difference signal to obtain said correlation function.

6. A method for recovering a data value and determining a propagation time from a received signal in a direct sequence spread spectrum receiver, said received signal having a chip period $T_c$, a bit period $T_b$ and being spread by a first sequence of pulses with pulse shape given by $$p\left(\frac{t}{T_c}\right)$$

where t is time, said pulses having an the auto-correlation function $$q\left(\frac{t}{T_c}\right);$$

said method comprising:

generating a second sequence of pulses with pulse shape given by $$p\left(\frac{t}{T_c}\right);$$

correlating said first and second sequence of pulses to obtain a correlation function;

detecting a peak in said correlation function; and determining said data value and said propagation time from the peak in said correlation function, wherein, in the absence of interference, the correlation function of said first and second pulse sequences is proportional to $$q\left(\frac{t}{T_c}\right) - q\left(\frac{t}{T_c} - 1\right).$$

7. A method as in claim 6, wherein said first sequence of pulses is generated from a pseudo-noise sequence $C=(C_1, C_2, C_3, \ldots, C_N)$ where $C_i=\pm 1$, said second sequence of pulses is generated from a sequence $C_C=(C_1-C_2, C_2-C_3, C_3-C_4, \ldots, C_{N-1}-C_N, C_N-C_1)$ and said correlating comprises:

multiplying said first and second sequences of pulses to obtain a product signal; and integrating said product signal to obtain said correlation function.

8. A method as in claim 6, wherein said second sequence of pulses is generated from a pseudo-noise sequence $C=(C_1, C_2, C_3, \ldots, C_N)$ where $C_i=\pm 1$, said first sequence of pulses is generated from a sequence, $C_c=(C_1-C_2, C_2-C_3, C_3C_4, \ldots, C_{N-1}-C_N, C_N-C_1)$ and said correlating comprises:

multiplying said first and second sequences of pulses to obtain a product signal; and integrating said product signal to obtain said correlation function.

9. A method as in claim 6, wherein said first sequence of pulses is generated from a pseudo-noise sequence $C=(C_1, C_2, C_3, \ldots, C_N)$ where $C_i=\pm 1$, said second sequence of pulses is generated from a sequence $C=(C_1, C_2, C_3, \ldots, C_N)$ and said correlating comprises:

multiplying said first and second sequences of pulses to obtain a product signal;

delaying said product signal to obtain a delayed product signal;

subtracting said delayed product signal form said product signal to obtain a difference signal; and integrating said product signal to obtain said correlation function.

10. A method as in claim 6, further comprising determining the time alignment between said first sequence of pulses and said second sequence of pulses from the peak in said correlation function.

* * * * *